April 4, 1950  E. C. HIGGINS  2,503,111
AMPHIBIOUS VEHICLE
Filed March 30, 1949  2 Sheets-Sheet 2

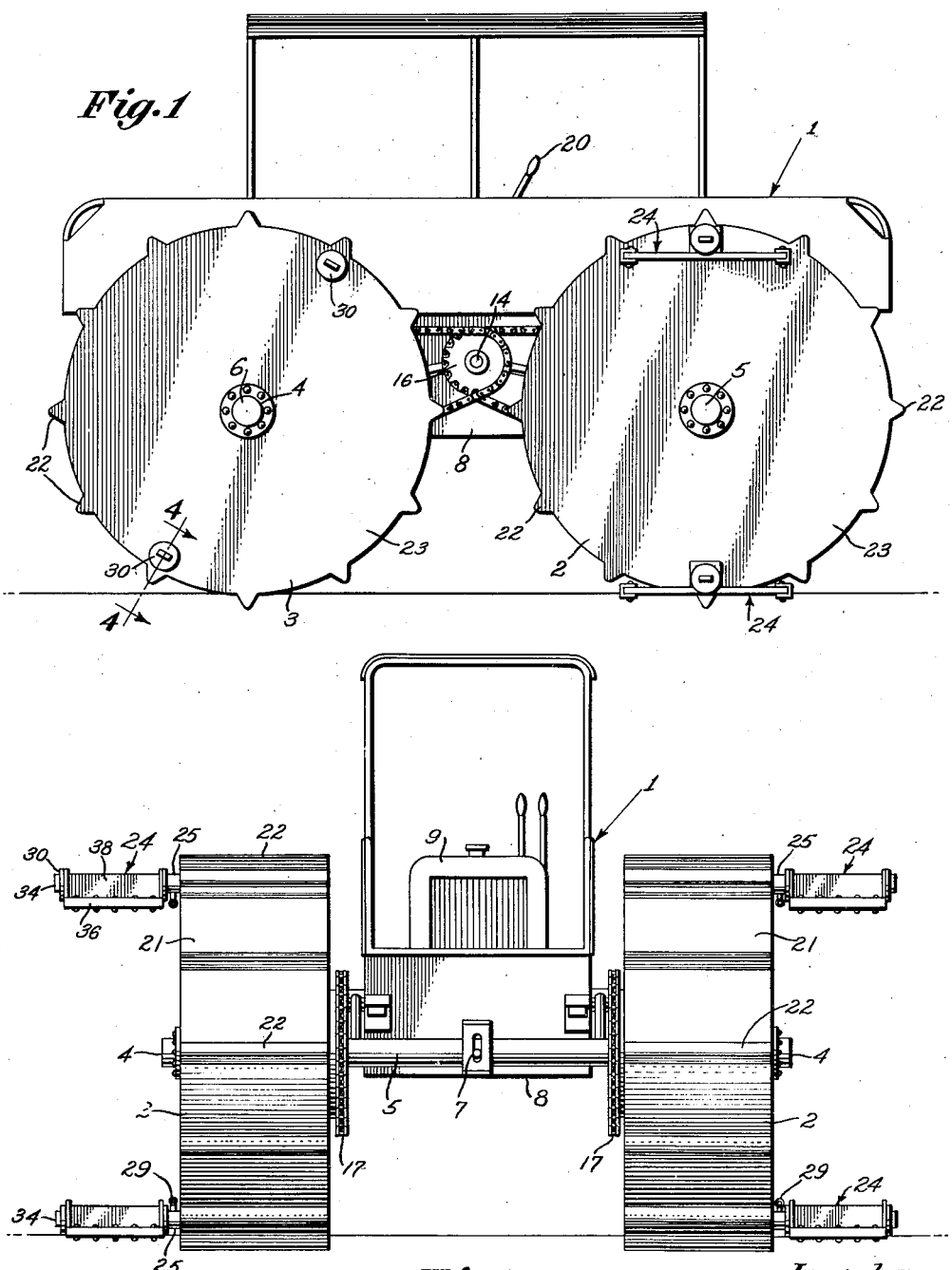

INVENTOR.
E. C. Higgins
BY Mason, Fenwick & Lawrence
Attorneys

Patented Apr. 4, 1950

2,503,111

UNITED STATES PATENT OFFICE 2,503,111

AMPHIBIOUS VEHICLE

Edmond C. Higgins, New Orleans, La., assignor to Higgins, Inc., New Orleans, La., a corporation of Louisiana Application March 30, 1949, Serial No. 84,276

7 Claims. (Cl. 115—1)

This invention relates to amphibious wheeled power driven vehicles.

It has for its general object the provision of a vehicle of the type described, designed for alternative travel on firm ground, soft ground, various conditions of soft and marshy terrain and also over water. Such a vehicle has an important field of use in marsh and tidelands, oil operation, swamp lumbering, etc.

One of the specific objects of the invention is the provision of an auto vehicle, the wheels of which are floats, and provided with cleats or other peripheral provisions improving their traction on dry land, and serving as paddle wheels for water propulsion.

Another object of the invention is to provide a four-wheeled drive vehicle, as described, having a differential in the driving train to each side, and independent brakes for each side, by means of which the driving wheels of either side may be slowed or stopped, resulting in steering of the vehicle toward that side.

Still another object of the invention is the provision of detachable steppers required only in soft mud, and secured in outboard relation to the wheels, peripherally thereof.

Other objects of the invention will appear as the following description of a preferred and practical embodiment thereof proceeds.

In the drawing which accompanies the following specification, and throughout the figures of which the same reference characters denote identical parts:

Figure 1 is a side elevation of an amphibious vehicle embodying the principles of the invention;

Figure 2 is an end elevation;

Figure 3:
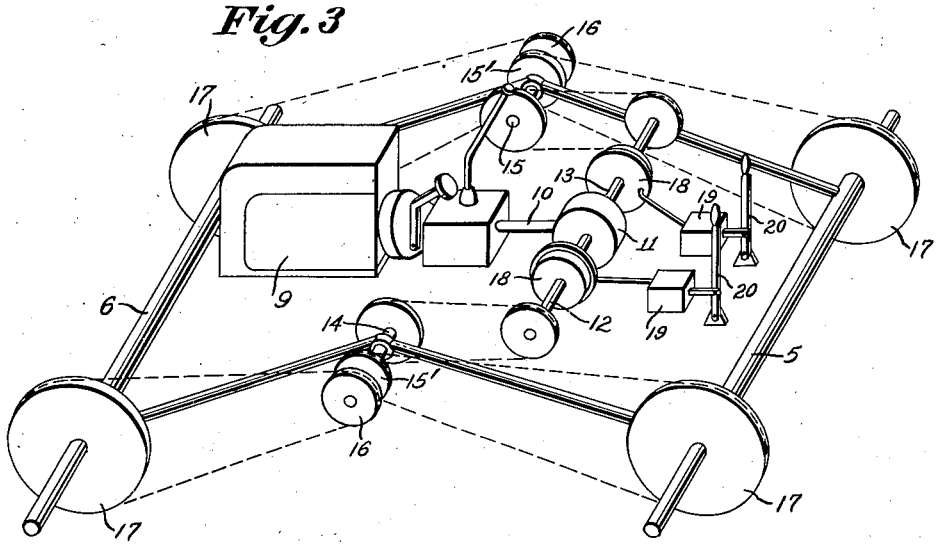
Figure 3 is a diagram in perspective, showing the driving and steering system.
Figure 4:
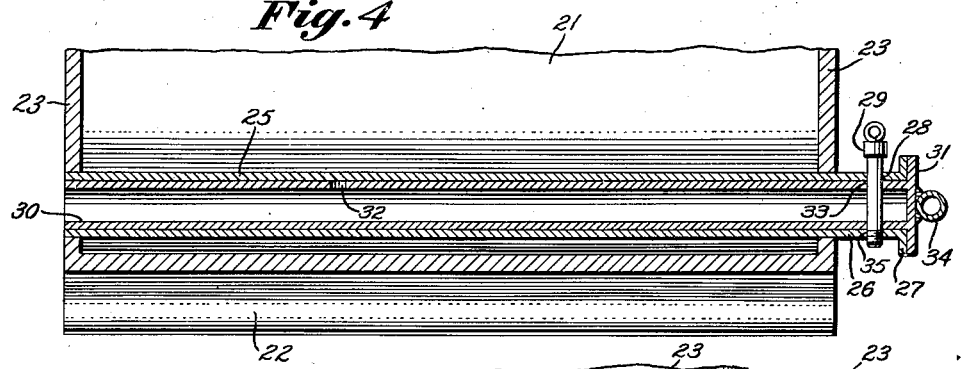
Figure 4 is a section taken along the line 4—4 of Figure 1.
Figure 5:
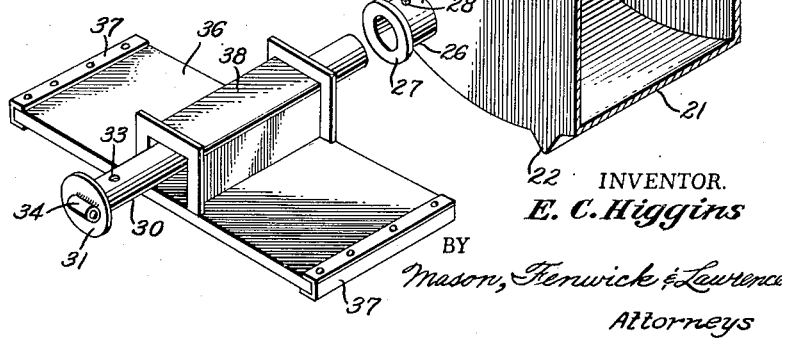
Figure 5 is an exploded perspective view showing part of a wheel and the cooperating stepper.

Referring now in detail to the several figures, the numeral 1 represents the vehicle as a whole, which is supported by the front and rear pairs of vehicle wheels 2 and 3, said wheels or floats, being in the form of hollow cylindrical watertight drums having axial tubes 4 extending therethrough, and being mounted upon the opposite ends of the front and rear axles 5 and 6. The axles have a pin and slot connection 7, with the chassis 8, but are restrained to oscillate solely in a vertical plane.

On the chassis is an internal combustion engine power plant 9, the drive shaft 10 of which leads to a differential 11, which distributes power to the opposite ends 12 and 13 of a lay shaft.

The opposite ends 12 and 13 of the lay shaft are independently chain connected to the stub shafts 14 and 15, journaled in transverse axial alignment on the chassis. Said stub shafts each has a pair of sprockets 15' and 16, providing chain drive connection with the similar sprockets 17, secured coaxially to the wheels 2 and 3.

Each of the ends 12 and 13 of the lay shaft carries a brake drum 18, with brake band, not shown. The brakes are independently hydraulically operated through the cylinder 19, by means of the respective hand levers 20. When either brake is applied it retards or stops the rotation of the wheels on that side. Through the operation of the differential the wheels on the other side keep rotating and are speeded up, causing the vehicle to turn in the direction of the side to which the braking action is applied.

The wheels 2 and 3 are preferably of welded construction, comprising a peripheral shell 21, having deep transverse ridges or cleats 22 projecting therefrom. The sides of the wheels are closed by the flat headers 23, which are welded to the shell 21. The width, volume, and distance apart of the wheels are calculated, with respect to the weight of the vehicle, so as to afford a stable base of support when it is water borne, in which the wheels do not submerge so deeply as to become inefficient as means of locomotion.

In traveling through soft mud or along a muddy bottom in shallow water, under which conditions a part of the weight of the vehicle is cancelled by its buoyancy, traction is greatly assisted by the provision of the steppers, four of which are shown in Figure 2, each of which being designated as a whole by the reference character 24. The steppers are ordinarily not attached when the vehicle is being used on dry land, on account of the fact that they extend its width to an impractical extent, and furthermore, the steppers would beat with destructive violence against hard surface on which the vehicle may be traveling. The steppers are ordinarily kept, dismounted, in the vericle, and are readily attached when their use is required. The illustrated embodiment of the invention indicates the use of two steppers for each wheel, but the invention contemplates that any number can be used within the limits of practicability.

For mounting the steppers the wheel is provided with open ended tubes 25, extending therethrough and welded to the opposite headers in watertight fashion. The outer end 26 of each tube extends beyond the adjacent header, and is preferably formed with a terminal flange 27 in a diametrical plane. The end 26 is provided with a hole 28, adapted to receive a locking pin 29. The stepper unit comprises a shaft 30, of such diameter as to freely slide within the tube 25. It is of substantially the same length as the tube 25 and provided at its outer end with a peripherally extending disk 31, which contacts the flange 27. The shaft 30 has two holes 32 and 33. When the stepper is not in place, the shaft 30 is telescoped within the tube 25 until the disk 31 abuts the flange 27, at which time the hole 33 is in the same zone as the hole 28. On the outside of the disk 31 there is welded a small section of pipe 34. Anything such as a nail, tool, or stick may be thrust into the pipe section 34 and used to turn the shaft 30 so as to bring the hole 33 into alignment with the hole 28, whereupon the locking pin 29 is inserted. The outer end of the locking pin is threaded and engages threads in the hole 35 which is opposite the hole 28. When the stepper is employed, the shaft 30 is thrown out far enough to receive the stepper. At this point the hole 32 comes into the zone of the locking pin, and later is thrust through the hole 32 in order to lock the shaft 30 in extended position. The stepper comprises a flat platform 36, preferably metal bound, as shown at 37 at its opposite ends, and having a preferably nonround bearing 38 secured to its upper face. The shaft 30 passes through said bearing, which loosely surrounds said shaft. This construction assures that the stepper will always be suspended and will be in a horizontal position when it contacts the surface of the mud. Experience has shown that the nonround bearing is more practical than one which fits the shape of the shaft, for it has been found that heavy mud collects in the annular space between the shaft and a cylindrical bearing, being uniformly condensed in all directions until finally the stepper revolves as a unit with the shaft 30, digging itself endwise into the mud, and becoming altogether ineffective. The nonround bearing prevents uniform condensation of the mud, which has a tendency to flow or be squeezed out from the enlarged spaces or corners between the bearing and shaft, so that the space between the shaft and bearing never becomes so completely clogged as to prevent the free suspension of the stepper.

In installing the stepper, the vehicle may be temporarily stopped with one of the tubes 25 in topmost position, as shown at the righthand side of Figure 1. It is an easy matter for the operator to lean over and place the stepper in position. The vehicle is then put in motion until the next tube 25 comes to the top of the wheel, whereupon, the next stepper is installed, and so on.

While I have in the above disclosure described what I believe to be a preferred and practical embodiment of the invention, it will be understood by those skilled in the art that the specific details of construction and arrangement of parts, as shown, are by way of example and not to be construed as limiting the scope of the invention.

What I claim as my invention is:

1. Amphibious vehicle comprising a chassis, buoyant wheels supporting said chassis, wheels each comprising a hollow cylindrical drum having a peripheral shell and opposite end headers secured thereto in watertight manner, a tube extending through said drum adjacent the periphery thereof having an open outer end, said tube being secured to said headers in watertight manner with respect to the interior of said drum, a shaft telescoping within said tube normally retracted but extensible therefrom, means for securing said shaft in retracted and extended positions, and a stepper suspendedly supported by said shaft when extended.

2. Amphibious vehicle as claimed in claim 1, said stepper comprising a plate and a bearing extending transversely of said plate secured to the upper surface thereof, suspending said stepper from said shaft.

3. Amphibious vehicle as claimed in claim 2, said stepper comprising a plate and a bearing secured along the transverse middle of the upper face of said plate, said bearing being of nonround cross-section loosely fitting said shaft.

4. Amphibious vehicle comprising a chassis, buoyant wheels supporting said chassis, said wheels each comprising a hollow cylindrical drum having a peripheral shell and opposite end headers secured thereto in watertight manner, an open ended tube extending through said drum adjacent the periphery thereof having an extension beyond the outer header provided with a diametrically opposed pair of holes, said tube being secured to said headers in watertight manner with respect to the interior of said drum, a shaft telescoping within said tube, normally retracted but extensible therefrom, having holes therethrough, adapted respectively to register with the holes in said extension when said shaft is in retracted and extended positions, a pin cooperating with said holes for locking said shaft in either position, and a detachable stepper suspendedly mounted on said extended shaft.

5. Amphibious vehicle as claimed in claim 4, said stepper comprising a plate and a bearing of rectangular cross-section secured transversely along the middle of the upper face of said plate and loosely surrounding said shaft.

6. Amphibious vehicle comprising a chassis, buoyant wheels supporting said chassis, said wheels each comprising a hollow cylindrical drum having a peripheral shell and opposite end headers secured thereto in watertight manner, an open ended tube extending through said drum adjacent the periphery thereof having an extension beyond the outer header provided with a hole in its side, said tube being secured to said headers in watertight manner with respect to the interior or said drum, a shaft telescoping within said tube, normally retracted but extensible therefrom having lateral holes therein adapted respectively to register with the hole in said extension when said shaft is in retracted and extended positions, a pin cooperating with said holes for locking said shaft in either position, means on the outer end of said shaft engageable by a tool for rotating said shaft to bring corresponding holes in said extension and shaft into alignment, and a detachable stepper suspendedly mounted on said extended shaft.

7. Amphibious vehicle comprising a chassis, buoyant wheels supporting said chassis, said wheels each comprising a hollow cylindrical drum having a peripheral shell and opposite end headers secured thereto in watertight manner, an open ended tube extending through said drum adjacent the periphery thereof having an extension beyond the outer header provided with a hole in its side, said tube being secured to said headers in watertight manner with respect to the interior of said drum, a shaft telescoping within said tube, normally retracted but extensible therefrom, having lateral holes therein adapted respectively to register with the hole in said extension when said shaft is in retracted and extended positions, a pin cooperating with said holes for locking said shaft in either position, a stop on the end of said shaft engageable with said extension to limit the retraction of said shaft, means on the outer end of said shaft engageable by a tool for rotating said shaft to bring corresponding holes in said tube and shaft into alignment, said means being an open ended pipe section diametrically disposed, and a detachable stepper suspendedly mounted on said extended shaft.

EDMOND C. HIGGINS.

REFERENCES CITED

The following references are of record in the file of this patent:

UNITED STATES PATENTS

| Number | Name | Date |
|---|---|---|
| 1,138,148 | Ramsey | May 4, 1915 |
| 1,318,557 | Heinze | Oct. 14, 1919 |
| 1,957,675 | Semmes | May 8, 1934 |
| 2,187,658 | Lane et al. | Jan. 16, 1940 |